Patented July 14, 1931

1,814,986

UNITED STATES PATENT OFFICE

MICHAEL J. WALSH, OF SAN DIEGO, CALIFORNIA, ASSIGNOR, BY MESNE ASSIGNMENTS, TO KELCO COMPANY, OF LOS ANGELES, CALIFORNIA, A CORPORATION OF DELAWARE

ALGINATES IN FINELY DIVIDED FORM DERIVED BY SPRAY-DRYING DILUTE SOLUTIONS THEREOF

No Drawing.   Application filed April 9, 1928.  Serial No. 268,799.

The present invention relates to alginic acid compounds such as alginates and double alginates, as well as to alginic acid itself (hydrogen alginate) in a novel form, in which they are more readily soluble.

Alginic acid is an organic substance that is derived from certain types of marine plants, and has been prepared from such plants as members of the general class of Phæophyceæ, the so-called Laminariæ, as Laminaria digitata, Laminaria saccharina, Laminaria cloustoni, and especially the giant kelps of the Pacific Ocean, such as Macrocystis and Nereocystis. For the sake of simplicity, I will hereafter refer to all of these plants by the common name of "kelp," by which I intend to cover any or all or mixtures of the above marine plants or algæ, such as may be harvested along or near the shores of the oceans, irrespective of the particular species involved, as I have found that all marine plants that contain sufficient amounts of alginic acid compounds may be used for the preparation of alginic acid. The average alginic acid compounds of the marine algæ that I prefer to employ is about 4% of the weight of the leached freshly harvested kelp.

In a copending application Serial No. 211,192, filed August 6, 1927, F. C. Thornley and I have described in detail a new process for the preparation of pure alginic acid (hydrogen alginate) and of various pure alginates from kelp.

In accordance with the process described in the said patent application Serial No. 211,192, freshly harvested kelp is treated by a system of pre-leaching operations to remove substantially therefrom the natural salts present therein by reason of the growing of the kelp in the saline water of the ocean. This pre-leaching is carried out at ordinary temperatures. The pre-leached kelp is thereupon transferred to other tanks where it is treated with warm water at approximately 140° F. The leach liquors derived from this treatment are employed for the pre-leaching of fresh kelp.

The thoroughly leached kelp is thereupon drained as far as possible from the leaching liquors, is roughly chopped up, and then transferred to digesting tanks wherein it is treated with a solution containing preferably an amount of sodium carbonate ($Na_2CO_3$) approximately equivalent to 4% of the weight of the leached and chopped kelp.

The treatment with the sodium carbonate solution lasts for about an hour, the mixture of kelp and solution being heated by the admission of live steam. Enough water is used with the chopped kelp and sodium carbonate to form a heavy pulp. The heating of the mixture by the steam disintegrates the kelp further and the resultant mass has the consistency of a rough pulp. The next step consists in grinding the rough pulp in a comminuting machine which converts the pulp into a much more finely divided state, so that the sodium carbonate will act more completely upon the alginic compounds contained in the kelp undergoing treatment.

The pulp issuing from the said comminuting machine or mill is next distributed among three tanks, in which it is diluted at about 140° F. with five times its volume of warm water. The diluted pulp thus obtained is boiled by the injection of live steam for a period of from one to one and a half hours, whereupon the creamy pulp formed as a result of the boiling is pumped to storage tanks.

The next step comprises passing the diluted pulp through a filtering system to remove the cellular debris of the kelp and any other undissolved matter. This filtration may take place in common bag filters, but it is preferred to carry out this step in mechanical rotary suction filters of the type known as "Oliver" filters. In order to speed up the filtration and to keep the filtering surface from clogging, and to obtain a more easily washed filter cake, the dilute pulp that is to be filtered receives the addition of a small amount of a filter-aid, such as a diatomaceous earth, preferably of the type known as "filter cell," and particularly of the grade known as "Hy-Flo." The filtrate obtained as the result of this operation is a solution of sodium alginate.

This alginate solution may then be dried and converted into one of the products which forms the subject of my present invention, or it may be converted into fibrous insoluble alginic acid. This conversion into fibrous alginic acid is accomplished substantially as follows: The solution of sodium alginate is introduced into a solution of calcium chloride having an hydrogen-ion concentration of from pH 11.5 to pH 10. Conditions are so controlled that the hydrogen-ion concentration of the mixed solution does not become greater than approximately pH 7.5 at any time. The result of the admixture of the solutions is the formation of insoluble calcium alginate. The solutions are violently stirred during the entire precipitation, with the result that the calcium alginate is precipitated in fibrous form, having much the appearance of slightly grayish-green cotton fibers.

This calcium alginate is afterwards directly converted into fibrous free alginic acid by treating the calcium alginate with dilute hydrochloric acid which transforms the calcium of the calcium alginate into calcium chloride, which is soluble, and is washed from the fibrous alginic acid. The alginic acid is then further washed with dilute hydrochloric acid until substantially all metallic salts have been removed therefrom, after which it is washed with pure water and filtered from the liquid in which it is suspended by means of rotary filters. In its final form it is like a matted mass of wet cotton fibers.

The alginic acid prepared in accordance with the aforementioned process is in the form of fibrous particles and when placed on the market usually consists of compact semi-dry masses, which in order to be reconstituted into solutions require prolonged maceration and stirring in the presence of mild alkalies, or other bases capable of combining the same, for the formation of soluble alginates.

Soluble alginates such as, for example, metallic alginates, as sodium and magnesium alginates, may be prepared from alginic acid and are usually furnished in the form of solutions containing approximately 15% of solids. Such solutions are of very heavy consistency and generally require dilution before it is possible to employ them for commercial purposes. Moreover, the expense involved in shipping such alginates in the presence of 85% of inert water is uneconomical.

Attempts have been made in the past to produce soluble alginates in dry form. Alginic acid compounds have very pronounced colloidal properties and a solution of sodium alginate, for example, has a viscosity which may be from 10 to 14 times that of a starch solution of equal concentration. Furthermore, it appears that the soluble alginates are irreversible or at least partially irreversible colloids, so that when solutions containing the same are merely evaporated to dryness, products will result which will not again pass into a solution having substantially the same characteristics as the solutions from which they were derived. The processes heretofore known of drying alginates, such as vacuum drying and oven drying, are not applicable to these products inasmuch as one or more of the valuable properties possessed by the dilute solutions of the alginates are lost in the process of drying, with the result that the dry products, when re-dissolved, will not function in the same manner as the material did prior to being dehydrated. Solutions of alginates which still retain their original inherent properties, have valuable applications, such as the ability to form highly viscous solutions even when diluted to a solution comprising but from 1 to 2% of solids; ability to emulsify oils, fats and waxes in dilute solutions; ability to hold in suspension pigments, minerals, inert fillers, etc.; ability to form films when dried out and the ability to act as binding agents.

Water-dispersible alginates have been produced either in the form of dry scales or in the fibrous form as set forth in said copending application already herein referred to. For the reasons just enumerated dry alginates in the form of scales have not proven satisfactory.

I have, therefore, invented a new product in the form of dry readily dispersible alginic acid compounds in powdered or finely comminuted form, in which form these compounds retain all of the highly colloidal and other valuable properties that have hitherto been inherent only in the original solutions of these compounds. By my present invention, I am able to produce especially useful alginic acid compounds or alginates, including hydrogen alginate, in concentrated form so that they may be dissolved in suitable solvents by the users thereof and applied as need be. Dry alginic acid compounds made in accordance with my present invention are exceedingly useful new products capable of very wide general application.

One of the objects of my present invention is to produce alginic acid compounds in the form of a very finely divided powder, and to accomplish this by drying solutions of alginic acid compounds while in the form of a fine spray or mist.

A further object of my invention is to produce compounds of alginic acid with volatile bases, such as, for example ammonium alginate in powdered form, and to accomplish this without the loss of the volatile base, such as ammonia, from the compound.

Furthermore, it is an object of my invention to spray solutions of alginic acid compounds into an atmosphere, which, by heating or otherwise, has had its capacity for water vapor absorption enhanced so that the moisture contained in the solutions that are sprayed into such atmosphere will rapidly be converted into vapor and the solids contained in the solutions converted in the form of a fine powder, which may be recovered by any convenient means, such as by settling or by centrifugal separators or similar means.

Further objects of my invention will appear in connection with the appended description.

The drying process known as the spray-drying process comprises injecting, atomizing or otherwise dispersing solutions of various materials dissolved in appropriate solvents into an atmosphere having such characteristics that the solvent portion of the solution will be converted into the vapor phase while the solute will be converted into solid particles which, in consequence of the small dimensions of the discrete drops to which the solution has been reduced, will be very minute. A further concomitant of this method of drying is that the removal of the solvent from the solute takes place with great rapidity and without undue heating of the solid.

I will now describe my invention in connection with the spray-drying of aqueous solutions of water-soluble alginic acid compounds. Such solutions should be fairly dilute and contain from substantially 3 to 5% of solid alginates, as under these conditions the solution will be sufficiently mobile to lend itself to spraying and conversion into an extremely fine atomized condition. The atomization may be effected by means of a spraying nozzle through which the solution is forced under pressure by means of compressed air, or by the use of a suitable hydraulic pump; or by allowing a stream of the solution to impinge upon a rapidly revolving disc. Under these conditions the solution will be thrown from the spray nozzle or from the periphery of the disc—whichever form of atomization is used—in the form of extremely minute droplets.

In carrying out my invention, I spray such a solution of alginates into a chamber which may take the form of a cylindrical tower while, at the same time, passing through the tower an atmosphere of heated air at a temperature ranging from approximately 212° F. to as high as 600° F., although I have found that an operating temperature of from 300° F. to 350° F. will lead to the production of excellent products. If the temperature of the air is fairly high, as for example 600° F., then the amount of sprayed material is so adjusted that there will be no tendency toward overheating and subsequent injury to the sprayed product by reason of the high temperature of the incoming air. The rapid exchange of temperature between the sprayed material and the air, in that case, will lower the temperature of the air to below the boiling point of water so that the air will leave the drying chamber or tower at from 150° to 175° F. The volume of air is so adjusted that the same will leave the chamber still unsaturated as to water vapor so that the air will not have any tendency to deposit moisture upon the dry comminuted alginic acid compounds.

In the drying chamber the spray of alginic acid compound solutions will be almost instantaneously converted into a dust of dry alginic acid compounds which will settle out of the air and may then be collected in any suitable manner. For example, the chamber may be large enough so that in the further reaches of the same the air may be sufficiently quiescent to allow of the natural settling of the powder, but it is to be construed as within the scope of my invention to employ a cyclonic separator which is a device well known in the art, and consists of centrifugal chambers into which the dust laden air is caused to pass at high speed tangentially so that the air and dust particles may be given a rapid cyclonic movement which throws the dust particles against the interior wall of the cylinder by centrifugal force, while the dust free air escapes through a centrally located exit passageway. Irrespective of the method of collecting the comminuted alginic acid compound, the product will appear in the form of small discrete particles which, in effect, resembles a dry powder. For ordinary purposes it is not essential that the alginic acid compounds be dehydrated to 100% solids; in fact, it may sometimes be desirable that the alginic acid compounds contain from 5 to 10% of moisture, so that during storage and during ordinary commercial handling there will exist an equilibrium between the moisture of the surrounding air and that in the alginic acid compounds.

When preparing finely comminuted water-soluble ammonium alginate, for example, I have found it to be advantageous to have present in the hot gases into which the alginate solution is sprayed, a certain quantity of gaseous ammonia, $NH_3$, so as to counteract the tendency of the ammonium alginate to lose ammonia during the dehydration stage. The presence of ammonia gas prevents the dissociation of the ammonium alginate and assures that the same, when in the dry comminuted or powdered state, will contain sufficient ammonium radicles to be equivalent to the replaced hydrogen atoms of the alginic acid. Alginic acid, it may be stated, is a polybasic acid, and is capable of forming neutral as well as acid salts.

I have found that my method of drying alginic acid compounds is applicable to such water-soluble compounds as sodium alginate, ammonium alginate, magnesium alginate, and the double alginates of magnesium and ammonium, copper and ammonium, zinc and ammonium, nickel and ammonium, and the like. Such compounds are described in said copending application Serial No. 211,192.

In practicing my present invention, I have found it advisable to employ solutions of the water-soluble alginates of a concentration not to exceed substantially 5%, as I have determined that the solutions of alginate containing as high as 15% of the same are generally too viscous to be sprayed advantageously. I have also found that a cylindrical tower of considerable height into which the solution is sprayed by a disc revolving at extremely high peripheral speed, or from a jet which is under air pressure or under pressure from a hydraulic pump, gives satisfactory results. The product obtained is in the form of a powder which is rapidly and easily soluble in water to form solutions that may be used for the impregnation of fabrics, the production of films, as a binder, or emulsifying agent, or for such other uses of which the alginates may be capable. This comminuted or powdered product of my invention, as obtained by the process described above, when dissolved possesses substantially the same properties as the original alginate solutions.

It is also to be construed as being within the scope of my invention to spray comminuted particles of alginic acid into an heated atmosphere containing sufficient ammonia to combine with the same to form ammonium alginate.

I wish to be understood that alginate solutions prepared by other processes may be dried and converted into the comminuted or powdered form in accordance with my present invention, for which I claim:

1. The process of producing comminuted substantially dry alginic acid compounds which comprises forming a solution containing such compounds and then spraying same into an atmosphere relatively unsaturated as to the solvent, whereby said solvent is converted into the vapor phase and the solute into individual minute particles of alginic acid compounds, and recovering said particles.

2. The process of producing comminuted substantially dry ammonium alginate which comprises spraying a solution of ammonium alginate into a hot gas containing ammonia.

3. The process of producing finely divided alginates containing ammonia which comprises spraying a solution of such alginates into a hot gas containing ammonia.

4. The process of producing finely divided sodium alginate which comprises forming a solution of such alginate and then spraying such solution into hot air.

5. Alginic acid compounds produced by forming a solution of the same and drying same by dispersing it in the form of a spray.

6. Spray-dried alginates.

7. A substantially dry soluble alginic acid compound having substantially all the properties, when dissolved in water, of original solutions of alginates, and which dry compound is produced by forming such solutions of alginates and dehydrating it by dispersing same in the form of a spray.

8. The process of drying soluble alginic acid compounds which comprises forming a solution containing from 3 to 5% of said compounds and spraying such solution into heated air at a temperature approximating substantially 300° to 600° F.

9. The process of producing soluble alginates capable of redissolving to form solutions having the same high viscosity as solutions of alginates that have never been dried, which comprises forming original solutions of soluble alginates and then spraying same into highly heated air whereby substantially instantaneous drying is effected and a powder results that when dissolved in water will reconstitute a solution having all the properties of the original solution.

10. Spray dried ammonium alginate.

11. Spray dried sodium alginate.

12. Spray dried metallic alginate.

13. The process of producing dry readily soluble alginic acid compounds in finely comminuted form; consisting in forming an aqueous solution of alginic acid and then spraying said solution into a relatively heated atmosphere whereby the water in the dispersed solution is converted into vapor and the alginic acid compounds precipitated in minute particles retaining all the properties possessed by the original solution.

14. The process of producing dry readily dispersible alginic acid compounds in finely comminuted form; consisting in forming a weak solution of water soluble alginic acid compounds containing approximately 5% of alginic acid, and then spraying said solution into a heated chamber; whereby the water in the dispersed solution is converted into vapor, and the alginic compounds precipitated in minute particles retaining all the properties possessed by the original alginates.

15. Sodium alginate produced directly in powdered form from an alginate solution and substantially instantaneously soluble in water.

16. Alginic acid compounds produced directly in finely powdered form from an alginate solution and substantially instantaneously soluble in water.

17. Ammonium alginate produced directly in powdered form from an alginate solution and substantially instantaneously soluble in water.

In witness whereof, I have hereunto subscribed my name.

MICHAEL J. WALSH.